April 18, 1950     K. M. CLOUD     2,504,499
INTERNAL-COMBUSTION ENGINE
Filed June 17, 1946
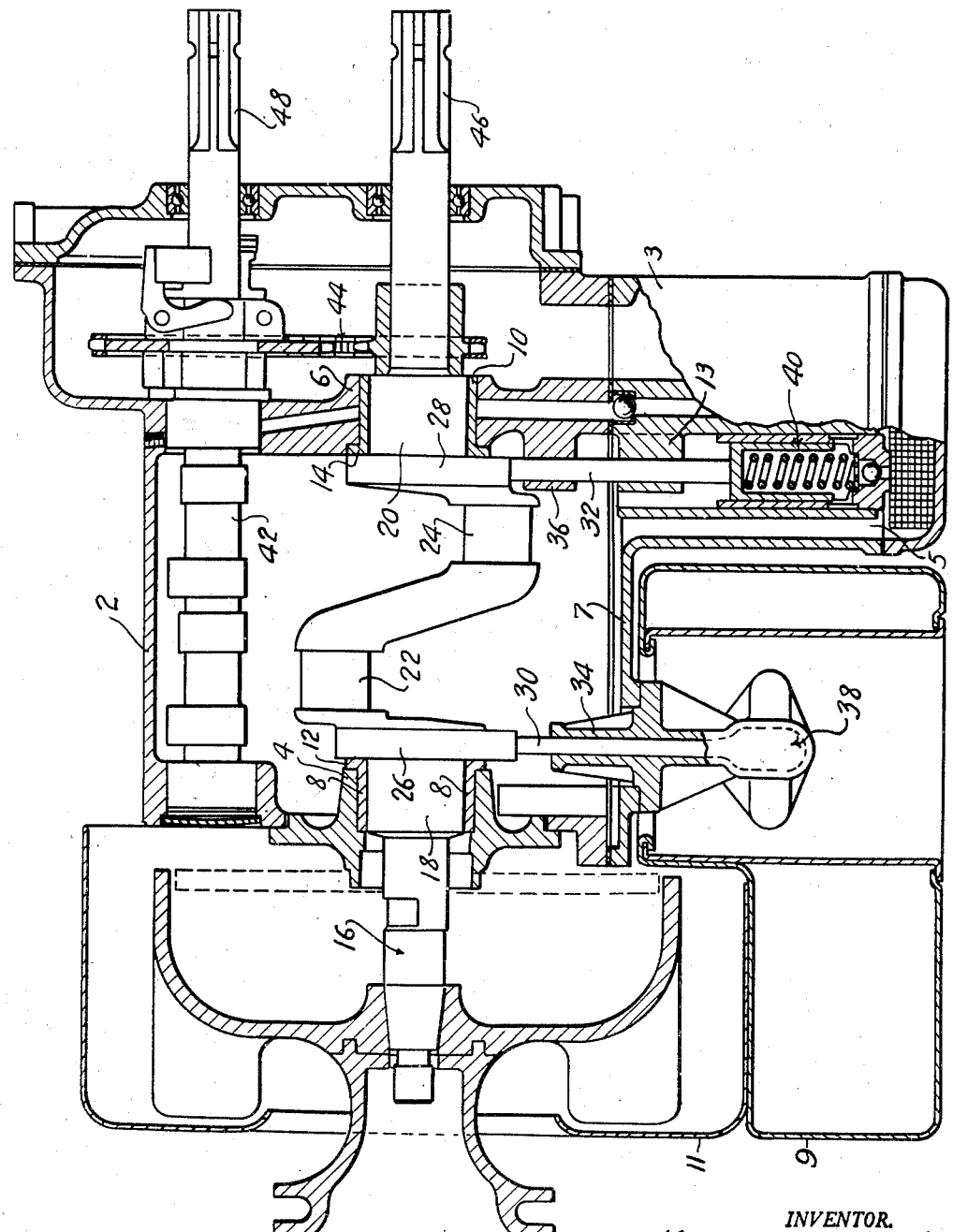
INVENTOR.
Kenneth M. Cloud
BY Hauke & Hardesty
ATTORNEYS Patented Apr. 18, 1950

2,504,499

UNITED STATES PATENT OFFICE 2,504,499

INTERNAL-COMBUSTION ENGINE

Kenneth M. Cloud, Muskegon, Mich., assignor to Continental Motors Corporation, Detroit, Mich., a corporation of Virginia Application June 17, 1946, Serial No. 677,334

3 Claims. (Cl. 123—195)

This invention relates to an engine assembly, especially to a portable internal combustion utility engine.

The engine to which this invention relates weighs around 50 pounds and is arranged with a plurality of power takeoffs of varying speed gear ratios with respect to the engine. In this way, a power plant is provided which is useful for numerous purposes. On a farm the engine may be moved about manually and used to drive such items of equipment as milk separators, milking machines, feed grinders, circular saws, water pumps, and the like.

An engine of the type in question must be such that it will run in any of a number of positions. It must be strong and rugged and yet not so heavy as to interfere with portability of the engine. The engine of this invention is preferably so constructed that it can operate with the crankshaft axis vertical or horizontal.

It is the object of this invention to provide a small and light utility engine that can operate in any of a number of positions without endangering the mechanism and without impairing operating efficiency.

In the drawings:

The sole figure of the drawing is a sectional view through the crankshaft axis of the engine.

The engine of this invention is a modification of the engine shown in patent application Serial No. 601,985, filed June 28, 1945, and assigned to the assignee of this invention.

The drawing shows a crank case 2 having a pair of aligned bearing supports 4 and 6. A main radial bearing 8 is disposed in bearing support 4, and a similar radial bearing 10 is located in bearing support 6. Radial bearings 8 and 10 are provided with integral thrust bearings 12 and 14 respectively. A crankshaft 16 is journaled in bearings 8 and 10 by means of integral bearing surfaces 18 and 20 respectively. Between the bearings 18 and 20, crankshaft 16 is provided with two opposed crank throws 22 and 24, on which the connecting rods (not shown) operate.

The bearing support is a part of the crankcase while bearing support 4 comprises a hub portion integrally carried by a closure plate which is secured to the crankcase structure and which covers or encloses the large opening in the crankcase through which the crankshaft is assembled.

Between bearing 18 and crank throw 22 there is provided an eccentric 26. As viewed in the drawing the left face of eccentric 26 is in contact with thrust bearing 12. Between bearing 20 and crank throw 24 there is a second eccentric 28, the right hand face of which is in contact with thrust bearing 14.

Eccentrics 26 and 28 serve as cams to actuate the plungers 30 and 32 which reciprocate in guides 34 and 36 respectively. Plunger 30 drives a fuel pump indicated generally at 38, and plunger 32 drives an oil pump 40 such as is shown in the copending above-identified application.

A camshaft 42 is also journaled in the crank case so that its axis is parallel to the crankshaft axis. Camshaft 42 is driven by crankshaft 16 through a chain and sprocket drive indicated generally at 44. Crankshaft 16 is provided with a power takeoff end 46 and the camshaft is provided with a power takeoff 48. With this arrangement, power taken from the crankshaft is at direct drive or the same as engine speed, while power taken from the camshaft is at half engine speed. Preferably, a third power takeoff shaft will be provided (not shown here) at still another ratio. The coupling and drive shaft for this purpose may be as shown in application Serial No. 611,998, filed August 22, 1945, and assigned to the assignee of this invention.

A supplemental crankcase structure 3 is secured to and depends from the main crankcase 2, and is provided with an oil sump portion 5 adjacent one end, the remaining portion thereof comprising a plate portion 7 closing the open crankcase bottom. A fuel tank 9 is supported in part beneath the crankcase immediately below the plate portion 7 and also beneath the flywheel housing 11. The fuel pump 38 is disposed in the fuel tank while the oil pump 40 is disposed in the oil sump 5. The bearing 34 for plunger 30 is carried by said plate portion 7 while the plunger 32 is guided in a bearing 13 carried by the supplemental crankcase structure 3 as well as by bearing 36 of the crankcase 2.

Operation

In operation the engine may run with the crankshaft horizontal or vertical. It should be noted that thrust bearings 12 and 14 are so arranged that one of them takes the thrust in one axial direction and the other bearing takes the thrust in the opposite axial direction.

It is further pointed out that the eccentrics 26 and 28 are inside, or between, the main bearings 18 and 20. The object of this arrangement is to reduce the amount of shaft overhang beyond the main bearing. This arrangement makes for a rugged and durable engine.

I claim:

1. A portable internal combustion engine having a main crankcase, a crankshaft, and bearing means carried by said crankcase and comprising outwardly flanged thrust bearings supporting said crankshaft and constructed and arranged so that one takes the thrust in one direction along the crankshaft axis and the other takes the thrust in the opposite direction along said axis, crank portions on said crankshaft intermediate said thrust bearings, said crankshaft having crank cheeks and integral cam elements each provided with an external end face directly reacting against the inner flanged end of the thrust bearing, a supplemental crankcase structure closing the lower open under side of the main crankcase and carrying an oil sump at one end, a fuel tank underlying the remaining portion of the supplemental crankcase structure, and bearing means for said cam followers carried by the supplemental crankcase structure, said cam followers projecting through the lower open under side of the main crankcase structure through said last mentioned bearing means, and separate fuel and oil pumping instrumentalities respectively operatively connected with said cam followers and respectively located in said fuel tank and said oil sump.

2. A portable internal combustion engine comprising a main crankcase structure, a thrust bearing at one end of said crankcase structure, a crankshaft supported by said thrust bearing and projecting beyond the crankcase structure and terminating in a power take-off shaft extension, said opposite end of the crankcase structure having an opening through which said crankshaft may be assembled to the engine, a closure plate for said opening and carrying a second thrust bearing supporting said crankshaft, said thrust bearings respectively constructed and arranged to resist thrust forces extending axially outwardly of the crankshaft in opposite directions, and a plurality of cam means carried by the crankshaft, each of said cam means having face portions bearing directly against the said thrust bearings, and accessory instrumentalities driven by said cam means.

3. A portable internal combustion engine comprising a main crankcase structure, a bearing support in one end wall thereof, a thrust bearing at one end of said crankcase structure, a crankshaft supported by said thrust bearing and projecting beyond the crankcase structure and terminating in a power take-off shaft extension, said opposite end of the crankcase structure having an opening through which said crankshaft may be assembled to the engine, a closure plate for said opening and provided with a bearing support carrying a second thrust bearing for supporting said crankshaft, said thrust bearings respectively constructed and arranged to resist thrust forces extending axially outwardly of the crankshaft in opposite directions, and a plurality of cam means carried by the crankshaft, each of said cam means having face portions bearing directly against said thrust bearings, and accessory instrumentalities driven by said cam means, said crankshaft having bearing portions supported in said thrust bearings and crank portions disposed intermediate said bearing portions, crank cheeks connecting said crank portions, with the crankshaft bearing portions, said cam means integrally formed on said crankshaft between the crank cheeks and said crankshaft bearing portions, each of said thrust bearings having outwardly flanged portions bearing against the inner face of the bearing supports supporting same.

KENNETH M. CLOUD.

REFERENCES CITED

The following references are of record in the file of this patent:

UNITED STATES PATENTS

| Number | Name | Date |
|---|---|---|
| 1,034,230 | Halbleib | July 30, 1912 |
| 1,564,059 | Goldberg | Dec. 1, 1925 |
| 2,136,960 | Wurtele | Nov. 15, 1938 |
| 2,180,352 | Fahrney | Nov. 21, 1930 |
| 2,410,143 | Altman | Oct. 29, 194 |